United States Patent
Chehab et al.

(10) Patent No.: US 12,534,782 B2
(45) Date of Patent: Jan. 27, 2026

(54) PROCESS FOR MANUFACTURING AN ALUMINUM ALLOY PART

(71) Applicant: C-TEC Constellium Technology Center, Voreppe (FR)

(72) Inventors: Bechir Chehab, Voiron (FR); Jochen Altenberend, Grenoble (FR); Ravi Shahani, Voreppe (FR)

(73) Assignee: C-TEC Constellium Technology Center, Voreppe (FR)

( * ) Notice: Subject to any disclaimer, the term of this patent is extended or adjusted under 35 U.S.C. 154(b) by 607 days.

(21) Appl. No.: 17/774,313

(22) PCT Filed: Nov. 18, 2020

(86) PCT No.: PCT/FR2020/052107
§ 371 (c)(1),
(2) Date: May 4, 2022

(87) PCT Pub. No.: WO2021/099735
PCT Pub. Date: May 27, 2021

(65) Prior Publication Data
US 2022/0389543 A1    Dec. 8, 2022

(30) Foreign Application Priority Data
Nov. 19, 2019 (FR) .................. 1912915

(51) Int. Cl.
*C22C 21/06* (2006.01)
*B22F 10/28* (2021.01)
(Continued)

(52) U.S. Cl.
CPC .............. *C22C 21/06* (2013.01); *B22F 10/28* (2021.01); *B23K 26/342* (2015.10); *B33Y 10/00* (2014.12);
(Continued)

(58) Field of Classification Search
CPC ....... C22C 21/06; C22C 1/0416; B22F 10/28; B22F 2301/052; B22F 10/00;
(Continued)

(56) References Cited

U.S. PATENT DOCUMENTS

| | | |
|---|---|---|
| 2017/0016096 A1 | 1/2017 | William et al. |
| 2018/0010216 A1 | 1/2018 | Vo et al. |

(Continued)

FOREIGN PATENT DOCUMENTS

| | | | |
|---|---|---|---|
| EP | 2127782 A1 | 12/2009 | |
| EP | 2799165 A1 * | 11/2014 | ............ B22F 3/02 |

(Continued)

OTHER PUBLICATIONS

International Search Report of International Application No. PCT/FR2020/052107, mailed Jan. 22, 2021.
(Continued)

*Primary Examiner* — Danielle M. Carda
(74) *Attorney, Agent, or Firm* — McBee Moore & Vanik IP, LLC (57) ABSTRACT

Process for manufacturing a part (20) including a formation of successive metal layers ($20_1 \ldots 20_n$), which are superimposed on each other, each layer being formed by depositing a filler metal (15, 25), the filler metal being subjected to a supply of energy so as to become molten and to constitute, upon solidifying, said layer, the process being characterized in that the filler metal (15, 25) is an aluminum alloy including the following alloy elements (% by weight);
Mg: 2.0%-5.0%;
Zr: 0.5%-1.0%;
Fe: 0.6%-3.0%;
optionally Zn: ≤0.5%;
optionally Cu: ≤0.5%;
other alloy elements, in total ≤4.0%, and individually ≤1.0%;

(Continued)

impurities: <0.05% individually, and in total <0.15%; remainder aluminum.

16 Claims, 5 Drawing Sheets

(51) Int. Cl.
    *B23K 26/342*     (2014.01)
    *B33Y 10/00*     (2015.01)
    *B33Y 40/20*     (2020.01)
    *B33Y 70/00*     (2020.01)
    *C22F 1/00*     (2006.01)
    *C22F 1/047*     (2006.01)

(52) U.S. Cl.
    CPC ............... *B33Y 40/20* (2020.01); *B33Y 70/00* (2014.12); *C22F 1/002* (2013.01); *C22F 1/047* (2013.01); *B22F 2301/052* (2013.01)

(58) Field of Classification Search
    CPC ...... B23K 26/342; B33Y 10/00; B33Y 40/20; B33Y 70/00; B33Y 80/00; C22F 1/002; C22F 1/047; Y02P 10/25
    USPC ........................................................ 148/549
    See application file for complete search history.

(56) References Cited

U.S. PATENT DOCUMENTS

| | | | |
|---|---|---|---|
| 2018/0245190 A1* | 8/2018 | Snyder | C22F 1/047 |
| 2019/0194781 A1 | 6/2019 | Eloi et al. | |
| 2020/0149136 A1* | 5/2020 | Kaufmann | C22C 21/08 |

FOREIGN PATENT DOCUMENTS

| | | | |
|---|---|---|---|
| JP | 2017218609 A | 12/2017 | |
| WO | 2015/006447 A1 | 1/2015 | |
| WO | 2018/009359 A1 | 1/2018 | |
| WO | WO-2018185259 A1 * | 10/2018 | ............. B33Y 10/00 |

OTHER PUBLICATIONS

Ma Rulong et al., "Effect of bimodal microstructure on the tensile properties of selective laser melt Al—Mg—Sc—Zr alloy", Journal of Alloys and Compounds, Elsevier, Sequoia, Lausanne, CH, Sep. 24, 2019, pp. 1-10, vol. 815.

* cited by examiner

PROCESS FOR MANUFACTURING AN ALUMINUM ALLOY PART

CROSS-REFERENCE TO RELATED APPLICATIONS

This application is the National Stage entry of International Application No. PCT/FR2020/052107, filed 18 Nov. 2020, which claims priority to French Application No. 1912915, filed 19 Nov. 2019.

BACKGROUND

Field

Technical Field

The technical field of the invention is a process for manufacturing an aluminum alloy part, using an additive manufacturing technique.

Description of Related Art

Since the 1980s, additive manufacturing techniques have been developed. They consist of forming a part by adding material, which is the opposite of machining techniques, which are aimed at removing material. Previously confined to prototyping, additive manufacturing is now operational for manufacturing mass-produced industrial products, including metallic parts.

The term "additive manufacturing" is defined as per the French standard XP E67-001 as a "set of processes for manufacturing, layer upon layer, by adding material, a physical object from a digital object". The standard ASTM F2792 (January 2012) also defines additive manufacturing. Various additive manufacturing methods are also defined in the standard ISO/ASTM 17296-1. The use of additive manufacturing to produce an aluminum part, with a low porosity, was described in the document WO2015006447. The application of successive layers is generally carried out by applying a so-called filler material, then melting or sintering the filler material using an energy source such as a laser beam, electron beam, plasma torch or electric arc. Regardless of the additive manufacturing method applied, the thickness of each layer added is of the order of some tens or hundreds of microns.

Further additive manufacturing methods can be used. Let us mention for example, and non-restrictively, melting or sintering a filler material taking the form of a powder. This may consist of laser melting or sintering. Patent application US20170016096 describes a process for manufacturing a part by localized melting obtained by exposing a powder to an electron beam or laser beam type energy, the process also being known as the acronyms SLM, meaning "Selective Laser Melting", or "EBM", meaning "Electro Beam Melting".

The mechanical properties of aluminum parts obtained by additive manufacturing are dependent on the alloy forming the filler metal, and more specifically on the composition thereof as well as on the thermal treatments applied following the implementation of additive manufacturing.

Silicon aluminum alloys, of type 4xxx, (Al—Si) optionally including Mg, are currently considered to be the most mature alloys for the application of the SLM process. However, this type of alloy can have some problems during anodizing. Furthermore, the conductivity, both thermal and electrical, is limited.

The document WO2018185259 describes an alloy, intended to be used in the form of a powder, in an SLM type additive manufacturing process. The alloy can particularly contain from 2% to 7% by mass of Mg. It can also contain a Zr mass fraction from 0 to 1%.

The document US20180010216 describes an alloy, intended to be used in the form of a powder, in an SLM type additive manufacturing process. The alloy can include a mass fraction of Mg from 1% to 10%, and from 0.45% to 3% of Zr. It is noted that this alloy does not include iron.

The document WO2018009359 describes an aluminum alloy, in powder form, including a mass fraction of Mg from 1 to 10%, and a mass fraction of Zr from 0.3 to 3%. The alloy can also include Fe, Cu, but these elements are then present in the form of unavoidable impurities, the content whereof is less than 500 ppm.

The inventors have determined an alloy composition which, used in an additive manufacturing process, makes it possible to obtain parts combining good mechanical properties, and particularly a good compromise between the elongation at rupture and the yield strength.

SUMMARY

The invention firstly relates to a process for manufacturing a part including a formation of successive metal layers, which are superimposed on each other, each layer being formed by depositing a filler metal, the filler metal being subjected to a supply of energy so as to become molten and to constitute, upon solidifying, said layer, the process being characterized in that the filler metal is an aluminum alloy including the following alloy elements (% by weight);
Mg: 2.0%-5.0%;
Zr: 0.5%-1.0%;
Fe: 0.6%-3.0%;
optionally Zn: ≤0.5%;
optionally Cu: ≤0.5%;
other alloy elements in total ≤4.0%, preferably ≤2.0%, and individually ≤1.0%, preferably ≤0.5%;
impurities: <0.05% individually, and in total <0.15%;
remainder aluminum.

Of the other alloy elements, mention can be made for example of Cr, V, Ti, Mo, Ni, W, Nb, Ta, Sc, Ni, Zn, Hf, Nd, Ce, Co, La, Ag, U, Y. Yb, Er, Sn, In, Si, Sb, Sr. Ba, Bi, Ca, P, B and/or mischmetal. The mass fraction of each other alloy element, taken individually, can be less than or equal to 1.0%, or 500 ppm, or 300 ppm, or 200 ppm, or 100 ppm.

In a manner known to a person skilled in the art, the composition of the mischmetal is generally from about 45 to 50% cerium, 25% lanthanum, 15 to 20% neodymium and 5% praseodymium.

The alloy can be such that it includes no Sc, except, optionally, in the impurity state. When the alloy includes Sc, the mass fraction of Sc is preferably strictly less than 500 ppm.

The alloy can be such that it includes no Mn, except, optionally, in the impurity state. When the alloy includes Mn, the mass fraction of Mn is preferably strictly less than 500 ppm.

The alloy can be such that it includes no Si, except, optionally, in the impurity state. When the alloy includes Si, the mass fraction of Si is preferably less than 0.2%, preferentially less than 0.15%.

According to an alternative embodiment of the present invention, the alloy is not an AA6xxx type alloy according to the Aluminum Association classification.

The process can include the following features, taken in isolation or according to technically feasible combinations:
Mg: 2.0%-3.5% and preferably Mg: 2.0%-3.0%;
Zr: 0.6%-1.0% and preferably 0.7%-0.95%;

Fe: 0.8%-1.5%.

Each layer can particularly describe a pattern defined on the basis of a digital model.

The process can include, following the formation of the layers, an application of at least one thermal treatment. The thermal treatment can be or include a stress relief, an aging or an annealing, capable of being performed at a temperature preferably from 200° C. to 500° C. It can also include a solution heat treatment and a quenching. It can also include a hot isostatic compression.

According to an advantageous embodiment, the process does not include a quenching type thermal treatment following the formation of the layers. Thus, preferably, the process does not include steps of solution heat treatment followed by a quenching.

According to a further embodiment, the filler metal takes the form of a powder, the exposure of which to a light beam or charged particles results in a localized melting followed by a solidification, so as to form a solid layer. According to a further embodiment, the filler metal is obtained from a filler wire, the exposure of which to a heat source, such as for example an electric arc, results in a localized melting followed by a solidification, so as to form a solid layer. The invention secondly relates to a metal part, obtained after applying a process according to the first subject matter of the invention.

The invention thirdly relates to a material, particularly in the form of a powder or a wire, intended to be used as a filler material of an additive manufacturing process, characterized in that it is formed from an aluminum alloy, including the following alloy elements (by weight):

Mg: 2.0%-5.0%;
Zr: 0.5%-1.0%;
Fe: 0.6%-3.0%;
optionally Zn: ≤0.5%;
optionally Cu: ≤0.5%;
other alloy elements in total ≤4.0%, preferably ≤2.0%, and individually ≤1.0%, preferably ≤0.5%;
impurities: <0.05% individually, and in total <0.15%;
remainder aluminum.

The aluminum alloy forming the filler material can have any one of the features described in relation to the first subject matter of the invention.

The filler material can be presented in the form of a powder. The powder can be such that at least 80% of the particles making up the powder have a size in the following range: 5 μm to 100 μm, preferably from 5 to 25 μm, or from 20 to 60 μm.

When the filler material is presented in the form of a wire, the diameter of the wire can particularly be from 0.5 mm to 3 mm, and preferably from 0.5 mm to 2 mm, and more preferably from 1 mm to 2 mm.

Further advantages and features will emerge more clearly from the following description of specific embodiments of the invention, given by way of non-limiting examples, and represented in the figures listed below.

DETAILED DESCRIPTION OF A PREFERRED EMBODIMENT

In the description, unless specified otherwise:
aluminum alloys are designated according to the nomenclature of the Aluminum Association;
the chemical element contents are designated as a % and represent mass fractions. The notation x %-y % means greater than or equal to x % and less than or equal to y %.
Impurity denotes chemical elements unintentionally present in the alloy.

Figure 1:
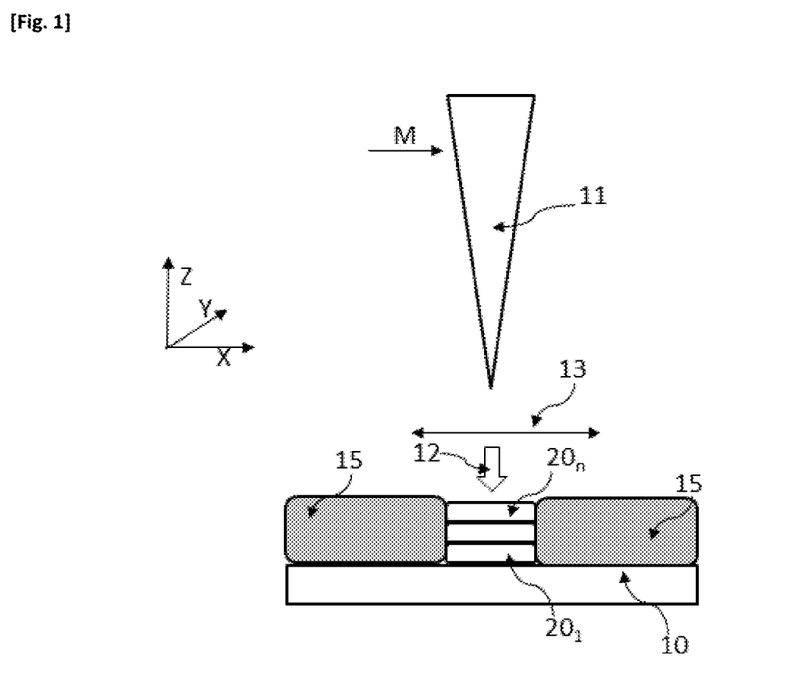
FIG. 1 is a diagram illustrating an SLM type additive manufacturing process.

FIG. 1 schematically represents the operation of a Selective Laser Melting (SLM) additive manufacturing process. The filler metal 15 is presented in the form of a powder disposed on a support 10. An energy source, in this case a laser source 11, emits a laser beam 12. The laser source is coupled with the filler material by an optical system 13, the movement whereof is determined according to a digital model M. The laser beam 12 is propagated along a propagation axis Z, and follows a movement along a plane XY, describing a pattern dependent on the digital model. The plane is for example perpendicular to the propagation axis Z. The interaction of the laser beam 12 with the powder 15 induces selective melting thereof, followed by a solidification, resulting in the formation of a layer $20_1 \ldots 20_n$. When a layer has been formed, it is coated with filler metal powder 15 and a further layer is formed, superimposed on the layer previously produced. The thickness of the powder forming a layer can for example be from 10 to 200 μm.

The powder can have at least one of the following features:
Mean particle size from 5 to 100 μm, preferably from 5 to 25 μm, or from 20 to 60 μm. The values given signify that at least 80% of the particles have a size within the specified range.
Spherical shape. The sphericity of a powder can for example be determined using a morphogranulometer;
Good castability. The castability of a powder can for example be determined as per the standard ASTM B213 or the standard ISO 4490:2018. According to the standard ISO 4490:2018, the flow time is preferably less than 50;
Low porosity, preferably from 0 to 5%, more preferably from 0 to 2%, even more preferably from 0 to 1% by volume. The porosity can particularly be determined by optical micrograph image analysis or by helium pycnometry (see the standard ASTM B923);
Absence or small quantity (less than 10%, preferably less than 5% by volume) of small, so-called satellite, particles (1 to 20% of the mean size of the powder), which adhere to the larger particles.

Such a powder is particularly adapted to the implementation of an SLM type process. Such a process makes it possible to obtain manufacturing, in parallel, of several monolithic parts, at a reasonable cost.

The inventors implemented an SLM type additive manufacturing process to produce parts, for example intended for vehicles or aircrafts. These parts must in particular have good mechanical properties, in particular from the point of view of the yield strength or the elongation at rupture. They must also have a low sensitivity to cracking.

However, the inventors observed that applying thermal treatments such as quenching could induce distortion of the part, due to the sudden temperature variation. The distortion of the part is generally all the more significant as the dimensions thereof are large. Yet, the advantage of an additive manufacturing process is specifically that of obtaining a part wherein the shape, after manufacturing is definitive, or virtually definitive. The occurrence of a significant deformation resulting from a thermal treatment is therefore to be avoided. By virtually definitive, it is understood that finishing machining can be performed on the part after the manufacturing thereof: the part manufactured by additive manufacturing extends according to the definitive shape thereof, apart from the finishing machining.

Having observed the above, the inventors sought an alloy composition, forming the filler material of an additive manufacturing process, making it possible to obtain satisfactory mechanical properties, without requiring the application of thermal treatments, subsequent to the formation of the layers, liable to induce distortion. The aim is particularly to avoid thermal treatments involving a sudden temperature variation. Thus, the invention makes it possible to obtain, by additive manufacturing, a part in which the mechanical properties are satisfactory, particularly the tensile mechanical properties (yield strength, elongation at rupture) as well as the sensitivity to cracking. Furthermore, the part resulting from the implementation of the process is compatible with electrochemical surface treatments, such as anodizing or electropolishing.

According to the type of additive manufacturing process selected, the filler material can be presented in the form of a wire or a powder.

The composition of the alloy must also be compatible with the specificities of an additive manufacturing process. This particularly consists of having the lowest liquidus temperature possible, so as to limit the evaporation of elements present in the alloy, in particular Mg.

A mass fraction of Mg from 2.0% to 5.0% makes it possible to obtain satisfactory mechanical properties. Preferably, the mass fraction of Mg is less than 3.5% or 3.0%, so as to limit the risks of intragranular corrosion, in particular during the exposure of a part manufactured at temperatures from 60° C. to 200° C. In order to obtain a good corrosion resistance, it is therefore preferable for the mass fraction of Mg to be from 2.0% to 3.5%, the optimal range being from 2.0% to 3.0%. Below 2.0%, the mechanical properties are considered to be insufficient: indeed, below 2.0%, there is considered to be an increased risk of cracking, in particular at the end of solidification. Thus, the mass fraction of Mg is optimized in order to obtain mechanical properties, while limiting the risks associated with corrosion.

Moreover, the inventors observed that a small mass fraction of Zr, from 0.5% to 1.0%, and preferably from 0.7% to 0.95%, makes it possible to obtain satisfactory tensile mechanical properties, in particular elongation at rupture. Moreover, the presence of Zr, coupled with a thermal treatment, makes it possible to improve the yield strength due to the formation of $Al_3Zr$ precipitates. Such a mass fraction of Zr makes it possible to maintain a relatively low liquidus temperature, below 1000° C. This makes it possible to limit the evaporation of volatile elements, such as Mg, when the alloy is subjected to a temperature greater than or equal to the liquidus temperature thereof. This particularly consists of:

the step of preparing the powder, during which the alloy has undergone atomization, so as to form liquid alloy droplets. The latter are intended to solidify to form the powder;

the implementation of the manufacturing process per se, during which the alloy undergoes localized melting under the effect of exposure to the incident laser beam.

The mass fraction of Zr is thus sufficient to improve the mechanical properties, while providing a sufficiently low liquidus temperature. This makes it possible to limit the temperature for manufacturing the powder or for implementing the additive manufacturing process.

Figure 2:
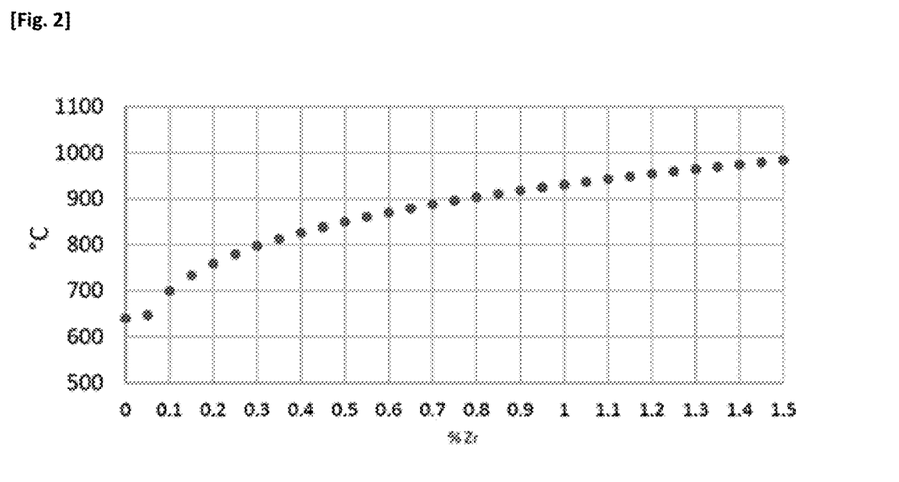
FIG. 2 illustrates the progression of a liquidus temperature according to the mass fraction of Zirconium.

FIG. 2 represents a progression of the liquidus temperature (° C.) according to the mass fraction of Zr (%), for an aluminum alloy including 3.0% Mg and 1.0% Fe. This curve was obtained with the aid of FactSage 7.1 software using the VLAB database supplied with the software. It shows that a Zr content less than 1.0% makes it possible to maintain the liquidus temperature less than or equal to 1000° C.

The alloy also includes a mass fraction of Fe from 0.6% to 3.0%, and preferably from 0.8% to 1.5%. Such a mass fraction makes it possible to obtain a good cracking resistance. The presence of Fe also makes it possible to increase the yield strength.

Optionally, the alloy can include Zn, according to a mass fraction less than or equal to 0.5%. This makes it possible to increase the corrosion resistance.

Optionally, the alloy can include Cu, according to a mass fraction less than or equal to 0.5%. This makes it possible to increase the corrosion resistance.

The alloy can include Zn and Cu, the cumulative mass fraction then being less than or equal to 0.5%.

The aluminum alloy can also include other alloy elements, such as for example Cr, V, Ti, Mn, Mo, W, Nb, Ta, Sc, Zn, Hf, Nd, Ce, Co, La, Ag, Li, Y, Yb, Er, Sn, In, Si, Sb, Sr, Ba, Bi, Ca, P, B and/or mischmetal, according to a cumulative mass fraction less than or equal to 4.0%, preferably less than or equal to 2.0%. The mass fraction of each other alloy element taken individually is less than or equal to 1.0%, preferably less than or equal to 0.5%.

Among the alloy elements listed above, it is preferable that the alloy does not include Sc or Mn, or according to low mass fractions, preferably less than 200 ppm or 100 ppm, or in the impurity state, i.e., without voluntary addition.

Besides good mechanical properties, the alloy as described above includes the following advantages:

a composition capable of being free from rare materials, for example Sc or rare earths;

a good corrosion resistance: indeed, the microstructures rapidly solidified and formed from alloys are considered to include a low content of transition metals (in this case Zr and Fe) having a good corrosion resistance. A possible cause is the absence of large particles usually referred to as "coarse particles" by a person skilled in the art;

a good compatibility with electrochemical surface treatment processes, in particular anodizing, through the absence, or low quantity, of Si and the fineness of the microstructure formed following the rapid solidification of the alloy.

Moreover, the alloy as described above has good mechanical properties without it being necessary to apply a post-manufacturing thermal treatment. As described hereinafter, in the experimental examples, the application of a thermal treatment, such as aging or annealing, makes it possible to increase the yield strength, at the expense of the elongation at rupture.

Experimental Examples

First tests were carried out using an alloy, in which the composition included, besides Al; Mg: 2.7%; Zr: 0.76%; Fe: 1.0%; impurities: <0.05% with cumulative impurities <0.15%. The liquidus temperature of such an alloy was estimated at 897° C. By way of comparison, an alloy of the type Al; Mg: 3.66%; Zr: 1.5%, as described in WO2018009359, has a liquidus temperature of 994° C.

Test parts were produced by SLM, using an EOS 290 SLM type machine (supplier EOS). The laser power was 370 W. The sweep rate was 1250 mm/s.

The deviation between two adjacent sweeping lines, usually referred to as the "hatch distance", was 0.11 mm. Each metal layer had a thickness of 60 µm. The slab on which the powder rested was heated to 200° C.

The powder used had a particle size essentially from 3 µm to 100 µm, with a median of 29 µm, a 10% fractile of 11 µm and a 90% fractile of 60 µm. The powder was formed from an alloy ingot using a Nanoval atomizer, at a temperature of 950° C. and a pressure differential of 4 bar. The powder resulting from the atomization was filtered in size, the filtering size being 90 µm.

Figure 3:
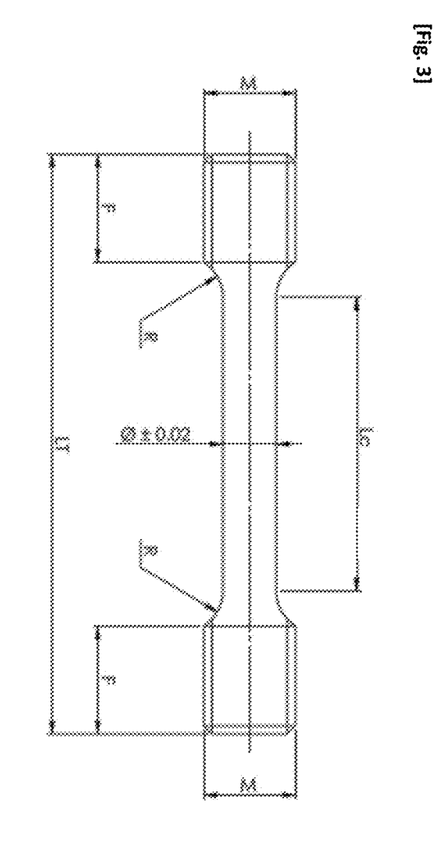
FIG. 3 is a test specimen geometry used to perform tensile tests, the test specimen being obtained from a first test part.

First test parts were produced, in the form of cylinders of diameter 11 mm and of height 46 mm. The first cylindrical test parts were machined to obtain cylindrical test specimens, intended for tensile tests, having dimensions listed in table 1. The geometry of the test specimens is represented in FIG. 3. In FIG. 3 and in table 1, Ø represents the diameter of the central portion of the test specimen, M the width of the two ends of the test specimen, LT the total length of the test specimen, R the radius of curvature between the central portion and the ends of the test specimen, Lc the length of the central portion of the test specimen and F the length of the two ends of the test specimen. The values given in table 1 are in millimeters.

TABLE 1

| Ø | M | LT | R | Lc | F |
|---|---|----|---|----|---|
| 4 | 8 | 45 | 3 | 22 | 8.7 |

The test specimens thus obtained underwent tensile testing at ambient temperature as per the standard NF EN ISO 6892-1(2009-10), so as to determine the elongation at rupture (A %) and the yield strength Rp0.2. These properties were measured parallel with the total length LT of each test specimen.

Table 2 compiles the tensile test results obtained with the test specimens (test 1, test 2, test 3 and test 4). For each test specimen, the thermal treatment has been entered, along with the elongation at rupture (A %-unit %) and the yield strength (RP0.2, unit: MPa). Prior to obtaining the test specimens, the first test parts underwent stress relief for a duration of 4 h at 300° C.

The first test parts, from which the test specimens test 2, test 3 and test 4 were machined, underwent annealing at 400° C. for durations respectively equal to 1 h, 4 h and 8 h. The first test parts, from which the test specimen test 1 did not undergo a thermal treatment after the stress relief. The purpose of the thermal treatment at 400° C. is to increase the yield strength, by promoting the formation of $Al_3Zr$ precipitates.

The results obtained were compared with reference results, obtained using an AlSi10Mg type alloy, these results being available in the bibliography, and in particular consultable on the website of the company EOS GmbH: https://gpiprototype.com/pdf/EOS_Aluminium_AlSi10Mg_en.pdf.

In table 2 hereinafter, the reference "ref 1" corresponds to an absence of thermal treatment, usually referred to using the term "as built". The reference "ref 2" corresponds to the application of a 2 h stress relief at 300° C.

TABLE 2

| Reference | Post-manufacturing thermal treatment | RP0.2 (mPa) | A % (%) |
|---|---|---|---|
| ref 1 | — | 240 | 6 |
| ref 2 | 300° C.-2 h | 230 | 11 |
| test 1 | — | 169 | 19 |
| test 2 | 400° C.-1 h | 226.5 | 14.5 |
| test 3 | 400° C.-4 h | 296.5 | 13.2 |
| test 4 | 400° C.-8 h | 288 | 12.8 |

Figure 4:
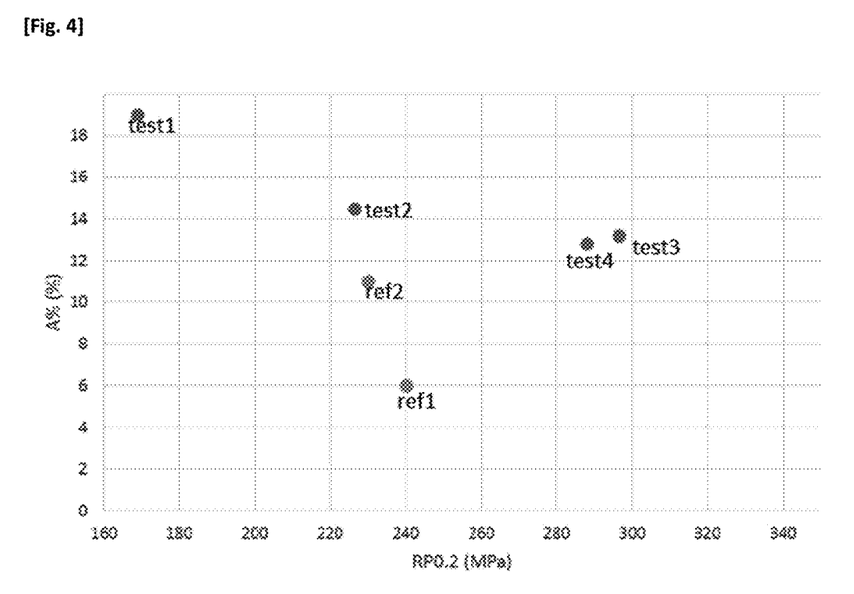
FIG. 4 represents the results of tensile tests performed on test specimens, prepared with an alloy according to the invention, and reference specimens, prepared with a reference alloy.

The results listed in table 2 are illustrated in FIG. 4. It is observed that the test specimens have a better yield strength/elongation at rupture compromise than the reference values. The tensile mechanical properties are superior.

Moreover, it is observed that without thermal treatment ("as built"), the yield strength measured on the first test part is less than the reference values. This is considered as advantageous, as less conducive to the appearance of cracking. Indeed, having a softer material makes it possible to limit residual stress, which can cause the appearance of cracking.

It is observed that advantageous mechanical properties are obtained, without needing to perform a solution heat treatment and quenching type treatment. It is recalled that it is preferable to avoid such a treatment, so as to avoid a sudden temperature variation, which can induce deformation of the manufactured part.

Figure 5:
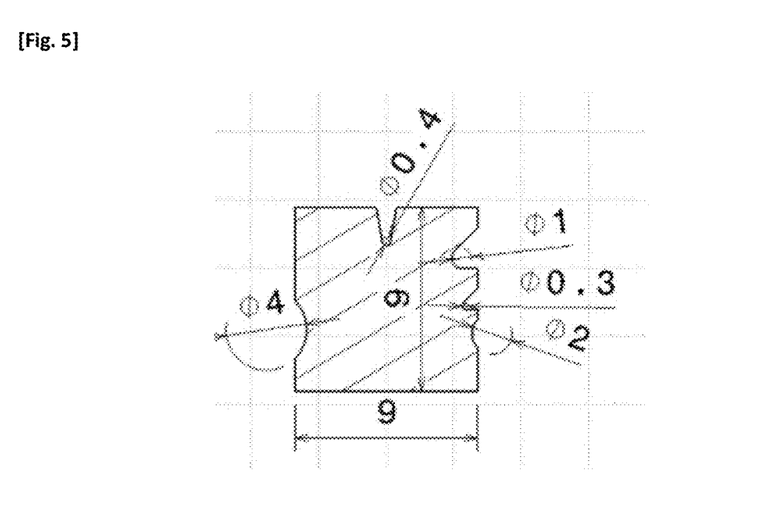
FIG. 5 represents a section of a second test part.

Second test parts were produced, taking the form of cubes of dimensions 9 mm×9 mm×9 mm. These cubes underwent etching so as to form grooves, of different diameters, intended to promote thermal cracking. Sections were formed, at mid-thickness, so as to evaluate the presence of cracking at cracks, as well as the porosity level. FIG. 5 shows the geometric characteristics of each section. On each section, an emery paper polishing was performed followed by a finish with a diamond paste to 1 µm.

Figure 6:
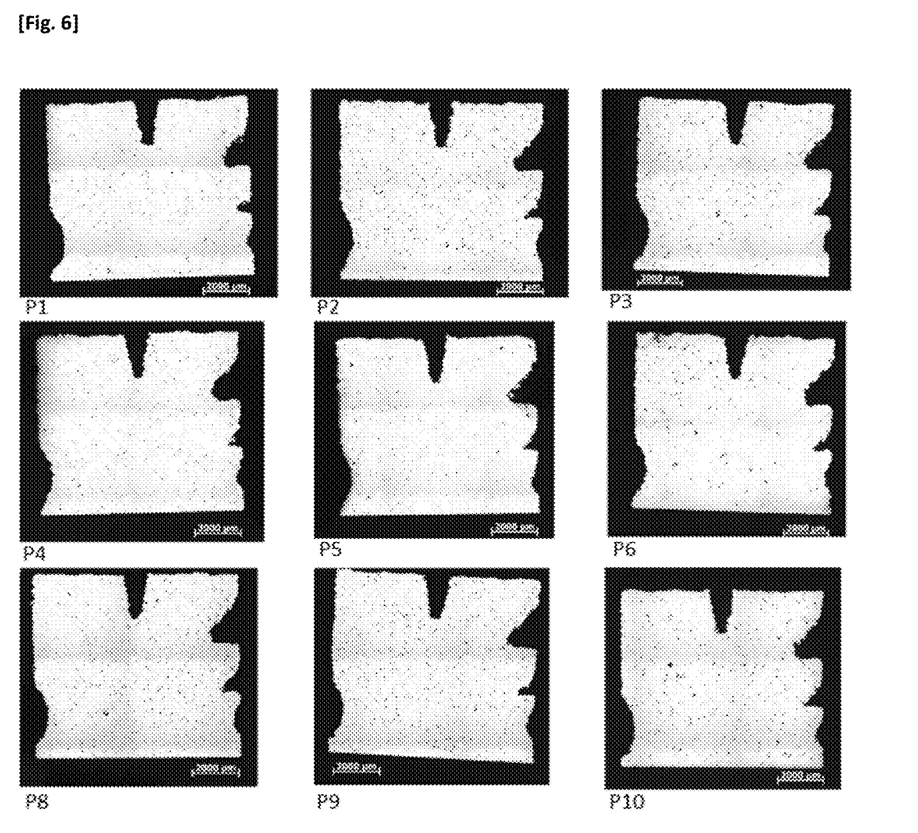
FIG. 6 shows sectional images of second test parts, after polishing, these images being used to quantify a level of porosity.

Table 3 represents, for different cubes, the manufacturing parameters (electrical power, hatch distance, sweep rate, deposition rate, usually referred to as "built rate"), as well as the porosity (%). The latter was estimated by analyzing images of the sections, after polishing, using the free software "Image J". Moreover, microscope analyses performed on each section, after polishing, confirmed the absence of cracking at the cracks. The alloy proposed by the inventors therefore has a low sensitivity to cracking. FIG. 6 represents the images of 9 sections after polishing.

TABLE 3

| Reference | Electrical power (W) | Hatch distance (mm) | Sweep rate (mm/s) | Deposition rate (cm³/h) | Porosity (%) |
|---|---|---|---|---|---|
| P1 | 370 | 0.111 | 1250 | 29.97 | 0.4 |
| P2 | 370 | 0.14 | 1275 | 38.56 | 0.9 |
| P3 | 310 | 0.14 | 1100 | 33.26 | 0.7 |
| P4 | 370 | 0.111 | 1250 | 20.97 | 0.4 |
| P5 | 370 | 0.137 | 1012 | 29.95 | 0.3 |
| P6 | 370 | 0.143 | 1613 | 49.83 | 0.9 |
| P7 | 370 | 0.177 | 1307 | 49.97 | 0.4 |
| P8 | 370 | 0.128 | 1443 | 39.90 | 0.9 |
| P9 | 370 | 0.158 | 1169 | 39.90 | 0.9 |
| P10 | 370 | 0.13 | 1400 | 39.31 | 0.7 |

A remarkable result is the absence of cracking, while the deposition rate and the sweep rate are high, and compatible with industrial rates of output. The invention makes it possible manufacture parts rapidly, without them being affected by cracking. Moreover, these results were observed while varying the manufacturing parameters, particularly the sweep rate and the hatch distance. Using the alloy as described above, it is not necessary to perform a precise adjustment of the experimental parameters, to define optimal manufacturing parameters reducing cracking.

The parts obtained from an alloy according to the invention are compatible with electrochemical surface treatment processes, such as anodizing or electropolishing. This is a significant advantage compared to Al—Si type alloys, the latter being considered to have little compatibility with such surface treatments, and in particular with electropolishing or anodizing. The alloy according to the invention then makes it possible to obtain parts with a good level of finish.

Figure 7A:
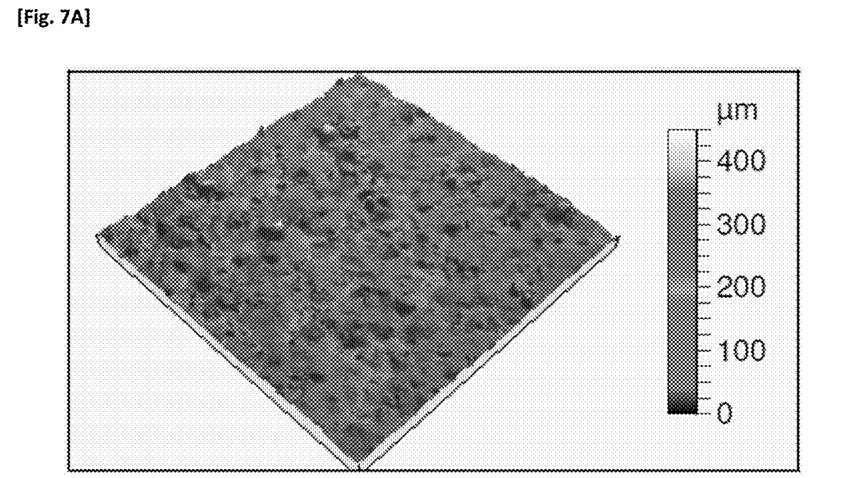
FIG. 7A is a three-dimensional surface profile produced on a third test part before electropolishing.
Figure 7B:
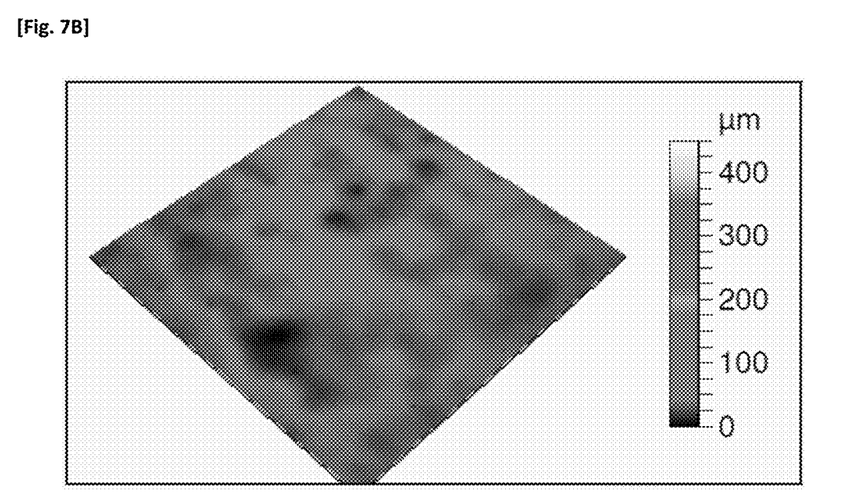
FIG. 7B is a three-dimensional surface profile produced on a third test part after electropolishing.

A third test part was produced, of parallelepipedal shape, of dimensions 150 mm×50 mm×3 mm. The third test part underwent an electropolishing. 3D surface profiles were produced respectively before and after electropolishing, using a Brukers GT3D K1 optical microscope. FIGS. 7A and 7B show the 3D profiles obtained respectively before and after electropolishing. Each profile was produced along a square surface with 4 mm sides. The surface condition was characterized particularly by the following parameters: roughness Ra (mean roughness deviation Ra as per the standard DIN NF EN ISO 4287), roughness Rz (mean profile height Rz as per the standard DIN NF EN ISO 4287) and standard deviation 6.

Table 4 hereinafter shows the results obtained:

TABLE 4

|  | Ra | Rz | σ |
|---|---|---|---|
| before electropolishing | 15 ± 3 μm | 82 ± 15 μm | 47.9% |
| after electropolishing | 1.9 ± 0.4 μm | 8.1 ± 1.7 μm | 1.35% |

It is observed that electropolishing enables a significant improvement in the surface condition. According to an embodiment, the process can include a hot isostatic compression (HIC). The HIC treatment can particularly make it possible to enhance the elongation properties and the fatigue properties. It can also help reduce the porosity. The hot isostatic compression can be carried out before, after or instead of the thermal treatment. Advantageously, the hot isostatic compression is carried out at a temperature of 250° C. to 500° C. and preferably of 300° C. to 450° C., at a pressure of 500 to 3000 bar and for a duration of 0.5 to 100 hours.

According to a further embodiment, adapted to structural hardening alloys, a solution heat treatment followed by a quenching and an aging of the part formed and/or a hot isostatic compression can be carried out. The hot isostatic compression can in this case advantageously replace the solution heat treatment.

However, the process according to the invention is advantageous, as it needs preferably no solution heat treatment followed by quenching. The solution heat treatment can have a harmful effect on the mechanical strength by promoting growth of dispersoids or fine intermetallic phases.

According to an embodiment, the method according to the present invention further optionally includes a machining treatment, and/or a chemical, electrochemical or mechanical surface treatment, and/or a tribofinishing. These treatments can be carried out particularly to reduce the roughness and/or enhance the corrosion resistance and/or enhance the resistance to fatigue crack initiation.

Optionally, it is possible to carry out a mechanical deformation of the part, for example after additive manufacturing and/or before the thermal treatment.

Figure 8:
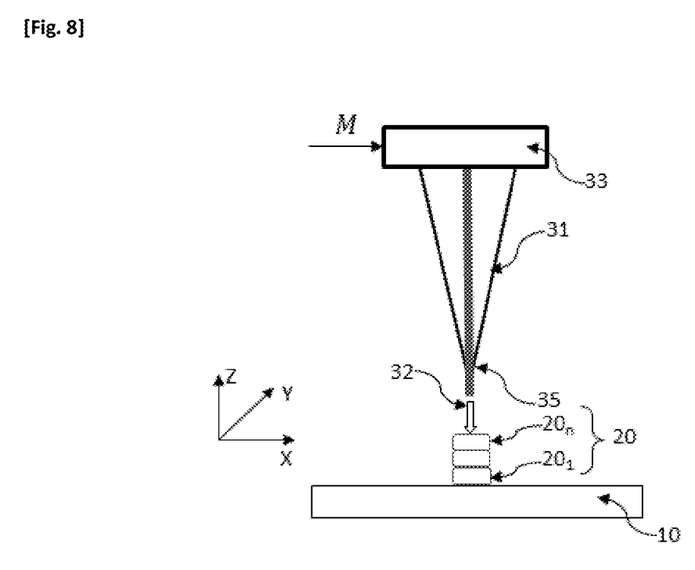
FIG. 8 is a diagram illustrating a WAAM type additive manufacturing process.

Though described in relation to an SLM type additive manufacturing method, the process can be applied to other WAAM type additive manufacturing methods, mentioned in relation to the prior art. FIG. 8 represents such an alternative. An energy source 31, in this case a torch, forms an electric arc 32. In this device, the torch 31 is held by a welding robot 33. The part 20 to be manufactured is disposed on a support 10. In this example, the part manufactured is a wall extending along a transverse axis Z perpendicularly to a plane XY defined by the support 10. Under the effect of the electric arc 12, a filler wire 35 becomes molten to form a weld bead. The welding robot is controlled by a digital model M. It is moved so as to form different layers $20_1 \ldots 20_n$, stacked on one another, forming the wall 20, each layer corresponding to a weld bead. Each layer $20_1 \ldots 20_n$ extends in the plane XY, according to a pattern defined by the digital model M.

The diameter of the filler wire is preferably less than 3 mm. It can be from 0.5 mm to 3 mm and is preferably from 0.5 mm to 2 mm, or from 1 mm to 2 mm. It is for example 1.2 mm.

Further processes can also be envisaged, for example, and non-restrictively:
  Selective Laser Sintering or SLS;
  Direct Metal Laser Sintering or DMLS;
  Selective Heat Sintering or SHS;
  Electron Beam Melting or EBM;
  Laser Melting Deposition;
  Direct Energy Deposition or DED;
  Direct Metal Deposition or DMD;
  Direct Laser Deposition or DLD;
  Laser Deposition Technology;
  Laser Engineering Net Shaping;
  Laser Cladding Technology;
  Laser Freeform Manufacturing Technology or LFMT;
  Laser Metal Deposition or LMD;
  Cold Spray Consolidation or CSC;
  Additive Friction Stir or AFS;
  Field Assisted Sintering Technology, FAST or spark plasma sintering; or
  Inertia Rotary Friction Welding or IRFW.

The invention claimed is:

1. A process for manufacturing a part including a formation of successive metal layers, which are superimposed on each other, each layer being formed by depositing a filler metal, the filler metal being subjected to a supply of energy so as to become molten and to constitute, upon solidifying, said layer, the process being wherein the filler metal is an aluminum alloy not including Mn, unless optionally in impurity state, and including the following alloy elements in % by weight;
Mg: 2.0%-5.0%;
Zr: 0.5%-1.0%;
Fe: 0.8%-1.5%;
Si: less than or equal to 300 ppm;
optionally Zn: ≤0.5%;
optionally Cu: ≤0.5%;
other alloy elements, in total ≤4%, and individually ≤1.0%, the other alloy elements being chosen from: Cr, V, Ti, Mo, Ni, W, Nb, Ta, Sc, Hf, Nd, Ce, Co, La, Ag, Li, Y, Yb, Er, Sn, In, Sb, Sr, Ba, Bi, Ca, P, B and/or mischmetal;
impurities: <0.05% individually, and in total <0.15%;
remainder aluminum.

2. The process according to claim 1, wherein Mg: 2.0%-3.5%.

3. The process according to claim 2, wherein Mg: 2.0%-3.0%.

4. The process according to claim 1, wherein Zr: 0.6%-1.0%.

5. The process according to claim 4, wherein Zr: 0.7%-0.95%.

6. The process according to claim 1, not including Sc or Scandium is in the impurity state.

7. The process according to claim 1, wherein the individual mass fraction of each other alloy element is less than 500 ppm.

8. The process according to claim 1, including, following formation of the layers, an application of a thermal treatment.

9. The process according to claim 8, wherein the thermal treatment is a stress relief or an aging or an annealing.

10. The process according to claim 8, wherein the thermal treatment is performed at a temperature from 200° C. to 500° C.

11. The process according to claim 1, not including a quenching type thermal treatment following formation of the layers.

12. The process according to claim 1, wherein the filler metal takes the form of a powder, the exposure of which to a light beam or charged particles results in a localized melting followed by a solidification, so as to form a solid layer.

13. The process according to claim 1, wherein the filler metal is obtained from a filler wire, exposure of which to a heat source results in a localized melting followed by a solidification, so as to form a solid layer.

14. The process according to claim 1, wherein the individual mass fraction of each other alloy element is less than 300 ppm.

15. The process according to claim 1, wherein the filler metal is an aluminum alloy not including Mn, unless optionally in impurity state, and consisting essentially of the following alloy elements in % by weight;
Mg: 2.0%-5.0%;
Zr: 0.5%-1.0%;
Fe: 0.8%-1.5%;
Si: less than or equal to 300 ppm;
optionally Zn: ≤0.5%;
optionally Cu: ≤0.5%;
other alloy elements, in total ≤4%, and individually ≤1.0%, the other alloy elements being chosen from: Cr, V, Ti, Mo, Ni, W, Nb, Ta, Sc, Hf, Nd, Ce, Co, La, Ag, Li, Y, Yb, Er, Sn, In, Sb, Sr, Ba, Bi, Ca, P, B and/or mischmetal;
impurities: <0.05% individually, and in total <0.15%;
remainder aluminum.

16. The process according to claim 1, wherein the filler metal is an aluminum alloy not including Mn, unless optionally in impurity state, and consisting of the following alloy elements in % by weight;
Mg: 2.0%-5.0%;
Zr: 0.5%-1.0%;
Fe: 0.8%-1.5%;
Si: less than or equal to 300 ppm;
optionally Zn: ≤0.5%;
optionally Cu: ≤0.5%;
other alloy elements, in total ≤4%, and individually ≤1.0%, the other alloy elements being chosen from: Cr, V, Ti, Mo, Ni, W, Nb, Ta, Sc, Hf, Nd, Ce, Co, La, Ag, Li, Y, Yb, Er, Sn, In, Sb, Sr, Ba, Bi, Ca, P, B and/or mischmetal;
impurities: <0.05% individually, and in total <0.15%;
remainder aluminum.

* * * * *